UNITED STATES PATENT OFFICE.

MAX ELB, OF DRESDEN, GERMANY.

PROCESS OF FREEING YEAST EXTRACTS FROM BITTER PRINCIPLES.

No. 804,524. Specification of Letters Patent. Patented Nov. 14, 1905.

Application filed December 18, 1903. Serial No. 185,690.

*To all whom it may concern:*

Be it known that I, MAX ELB, a subject of the King of Saxony, and a resident of Dresden, in the Kingdom of Saxony, German Empire, have invented a new and useful Process of Freeing Yeast Extracts from Bitter Principles, of which the following is an exact specification.

My invention relates to a process of freeing yeast extracts from bitter principles by means of which the bitter taste of alimentary yeast extracts (especially extracts of beer-yeast) is avoided. Nearly all alimentary yeast extracts have a disturbing bitter aftertaste which is derived partly from the dissolved hop-resins in the cells of the yeast and partly from other alkaloids and bitter principles. In order to free the yeast extracts from these bitter principles and to obtain a pure yeast extract the extracts are treated according to the present invention with a substance which gives off oxygen—that is to say, with oxidizing agents. By this treatment a precipitation of the bitter principles takes place most probably in consequence of the said principles becoming resinous, so that the precipitated bitter principles can be removed by filtration. The treatment with the substances giving off the oxygen can be carried out both with the clear or somewhat condensed extract and with the extract which still contains the residue of the yeast-cells. The process may also be carried out afterward after dissolving the already condensed extract.

For carrying the process into effect nearly all oxidizing agents can be used as far as these agents do not deleteriously affect the alimentary qualities of the extract. So, for instance, ozone, oxygen in *statu nascendi*, superoxids, or the like may be used. In case of residues remaining in the solution—as is the case for instance, in using peroxid of manganese or peroxid of barium—these residues must be removed in the well-known way. It has proved most advantageous to use peroxid of hydrogen for carrying the process into effect. In using peroxid of hydrogen the process may be carried out, for instance, by condensing the yeast extract to half of its volume, then adding the peroxid of hydrogen and boiling the mixture for a short time. The quantity of peroxid of hydrogen added amounts to about sixty to one hundred cubic centimeters for one kilogram of perfectly-condensed yeast extract. The resulting precipitates are very hard to filter, and it is therefore advantageous to remove the same by means of one of the well-known clarifying processes—such as, for instance, by means of albumen.

Having thus fully described the nature of my invention, what I desire to secure by Letters Patent of the United States, is—

1. The process for freeing yeast extracts from bitter principles, consisting in condensing the extract, then precipitating the bitter principles by treating the condensed extract with oxidizing means, and removing these principles from the extract, substantially as described and for the purpose set forth.

2. The process for freeing yeast extracts from bitter principles, consisting in precipitating the bitter principles by treating the yeast extracts with peroxid of hydrogen and boiling the mixture for a short time, and removing these principles from the extract, substantially as described and for the purpose set forth.

3. The process for freeing yeast extracts from bitter principles, consisting in condensing the yeast extract to half of its volume, then precipitating the bitter principles by adding peroxid of hydrogen and boiling the mixture for a short time, and removing these principles from the extract, substantially as described and for the purpose set forth.

4. The process for freeing yeast extracts from bitter principles, consisting in adding to the yeast extract an oxidizing agent, boiling the mixture for a short time and then removing the resulting precipitates, substantially as described and for the purpose set forth.

5. The process for freeing yeast extracts from bitter principles, consisting in precipitating the bitter principles by treating the yeast extracts with an oxidizing agent, and removing the resulting precipitates by treating the mixture with albumen, substantially as described and for the purpose set forth.

6. The process for freeing yeast extracts from bitter principles, consisting in adding to the yeast extracts from sixty to one hundred cubic centimeters of peroxid of hydrogen for each kilogram of condensed yeast extract to be manufactured, boiling the mixture and removing the resulting precipitates, substantially as described and for the purpose set forth.

7. The process for freeing yeast extracts from bitter principles, consisting in condensing the yeast extract to half of its volume, then adding from sixty to one hundred cubic centimeters of peroxid of hydrogen for each kilogram of perfectly-condensed yeast extract to be manufactured, boiling the mixture and removing the resulting precipitates, substantially as described and for the purpose set forth.

In testimony whereof I have signed my name to this specification in the presence of two subscribing witnesses.

MAX ELB.

Witnesses:
PAUL E. SCHILLING,
PAUL ARRAS.